United States Patent
Zhang et al.

(10) Patent No.: US 8,255,882 B2
(45) Date of Patent: Aug. 28, 2012

(54) SELECTING FORMATS FOR MULTI-FORMAT INSTRUCTIONS IN BINARY TRANSLATION OF CODE FROM A HYBRID SOURCE INSTRUCTION SET ARCHITECTURE TO A UNITARY TARGET INSTRUCTION SET ARCHITECTURE

(75) Inventors: Qi Zhang, Shanghai (CN); Jianhui Li, Shanghai (CN); Shu Xu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1398 days.

(21) Appl. No.: 11/794,453

(22) PCT Filed: Dec. 30, 2004

(86) PCT No.: PCT/CN2004/001573
§ 371 (c)(1),
(2), (4) Date: Jun. 29, 2007

(87) PCT Pub. No.: WO2006/069485
PCT Pub. Date: Jul. 6, 2006

(65) Prior Publication Data
US 2008/0141011 A1    Jun. 12, 2008

(51) Int. Cl.
*G06F 9/45* (2006.01)
(52) U.S. Cl. ........................ 717/136; 712/226
(58) Field of Classification Search .................. 717/136; 712/226
See application file for complete search history.

(56) References Cited

U.S. PATENT DOCUMENTS

| | | | | |
|---|---|---|---|---|
| 5,561,801 A * | 10/1996 | Simons et al. | ................ | 717/149 |
| 5,619,665 A * | 4/1997 | Emma | ........................... | 712/208 |
| 5,640,588 A * | 6/1997 | Vegesna et al. | .................. | 712/23 |
| 6,163,764 A * | 12/2000 | Dulong et al. | ................ | 712/227 |
| 6,408,386 B1 * | 6/2002 | Hammond et al. | ........... | 712/244 |
| 6,496,922 B1 * | 12/2002 | Borrill | ......................... | 712/209 |
| 6,557,094 B2 * | 4/2003 | Pechanek et al. | ............. | 712/209 |
| 6,745,176 B2 * | 6/2004 | Probert et al. | ................ | 709/230 |
| 7,251,811 B2 * | 7/2007 | Rosner et al. | ................ | 712/227 |
| 2004/0221279 A1 * | 11/2004 | Lovett et al. | .................. | 717/138 |

(Continued)

FOREIGN PATENT DOCUMENTS
EP    1033650    9/2000

OTHER PUBLICATIONS
Kim et al., "Dynamic Binary Translation for Accumulator-Oriented Architectures", 2003, IEEE.*

(Continued)

*Primary Examiner* — Wei Zhen
*Assistant Examiner* — Junchun Wu
(74) *Attorney, Agent, or Firm* — Blakely, Sokoloff, Taylor & Zafman LLP

(57) ABSTRACT

A method, according to one aspect, may include estimating costs associated with translating a multi-format instruction of a source instruction set architecture to instructions of a target instruction set architecture by using a different format of the multi-format instruction for each of the costs, and selecting a format for the multiformat instruction based at least in part on the estimated costs. Methods of organizing or grouping multi-format instructions based on register use relationships. Software, hardware, and computer systems to implement the methods are also disclosed.

24 Claims, 5 Drawing Sheets

U.S. PATENT DOCUMENTS

2004/0255279 A1* 12/2004 Rawsthorne et al. ......... 717/136
2005/0055389 A1* 3/2005 Ramanujam ................. 708/204
2005/0235269 A1* 10/2005 K N et al. .................... 717/136

OTHER PUBLICATIONS

Altman et al.,"BOA: The Architecture of a Binary Translation Processor", Dec. 2000, IBM.*

Gschwind et al., "Dynamic and Transparent Binary Translation", 2000, IEEE.*

Ebcioglu et al., "Dynamic Binary Translation and Optimization", Jun. 2001, IEEE, vol. 50, No. 6.*

Kim et al., "An Instruction Set and Microarchitecture for Instruction level distributed processing", 2002, IEEE.*

CN PTO, "First Office Action", Office Action issued Sep. 12, 2008 for CN Application No. 200480044804.6, pp. 1-5.

CN PTO, "Second Office Action", Chinese Application No. 200480044804.6, Issued Mar. 27, 2009, 7 pages.

Notice of Allowance mailed Aug. 21, 2009 for Chinese Patent Application 2004 80044806.6.

Int'l Search Report & Written Opinion mailed Oct. 13, 005 Int'l Patent Application No. PCT/CN2004/001573.

* cited by examiner

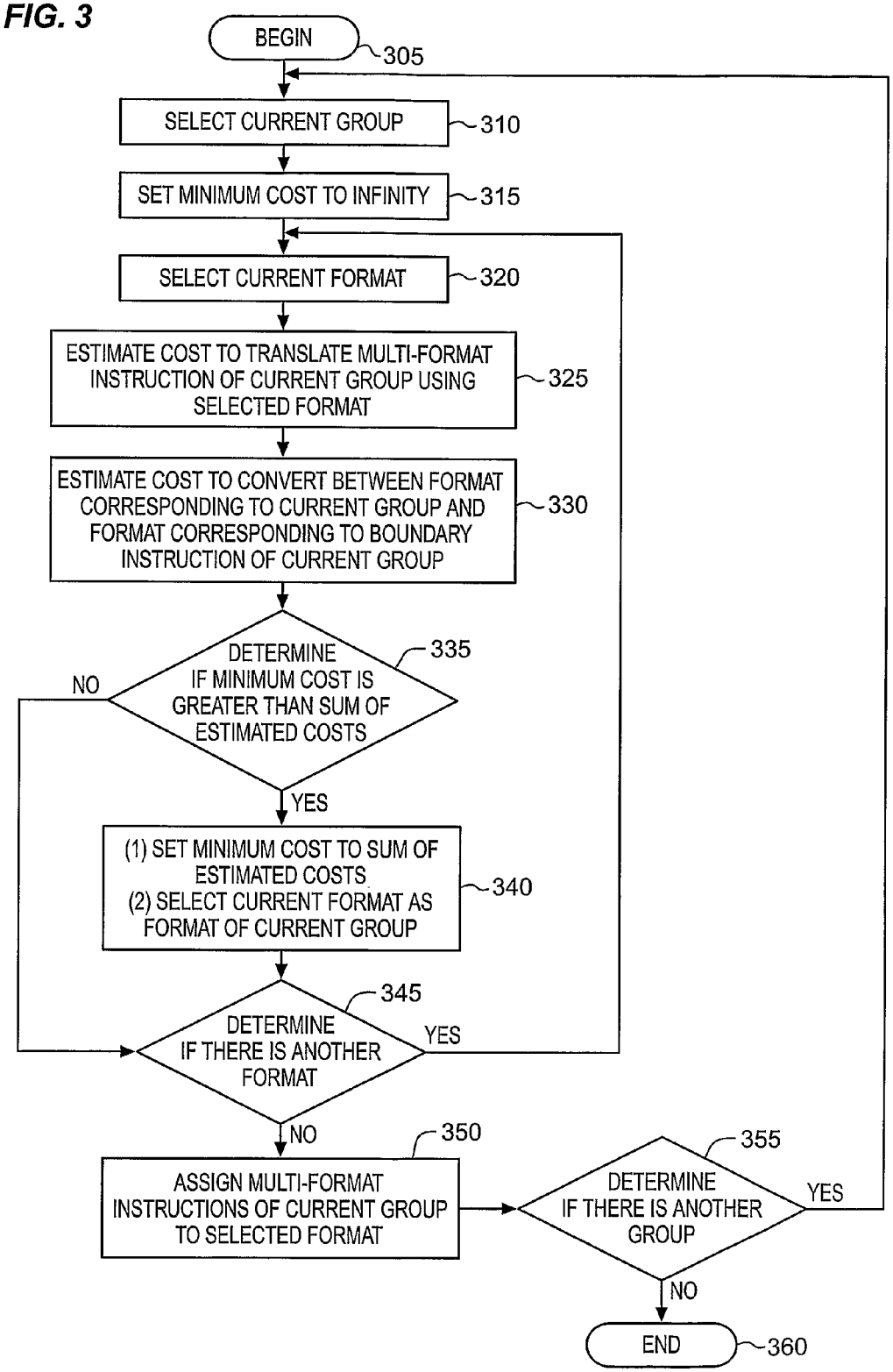

SELECTING FORMATS FOR MULTI-FORMAT INSTRUCTIONS IN BINARY TRANSLATION OF CODE FROM A HYBRID SOURCE INSTRUCTION SET ARCHITECTURE TO A UNITARY TARGET INSTRUCTION SET ARCHITECTURE

CROSS REFERENCE TO RELATED APPLICATION

The present application is a U.S. National Phase Application under 35 U.S.C. §371 of International Application No. PCT/CN2004/001573 filed Dec. 30, 2004 entitled SELECTING FORMATS FOR MULTI-FORMAT INSTRUCTIONS IN BINARY TRANSLATION OF CODE FROM A HYBRID SOURCE INSTRUCTION SET ARCHITECTURE TO A UNITARY TARGET INSTRUCTION SET ARCHITECTURE.

BACKGROUND

1. Field

Embodiments of the invention relate to the field of instruction translation.

2. Background Information

Binary translation may be performed in order to translate source code of a source instruction set architecture (ISA) that is suitable for a source machine or processor to target code of a target ISA that is suitable for a target machine or processor on a target operating system. In the binary translation, source instructions of the source ISA may be translated to target instructions of the target ISA.

In some translations, the source ISA may be a hybrid ISA, while the target ISA may be a unitary ISA. A hybrid ISA may have one or more multi-format instructions that may use the same or similar semantics to operate on data having different formats, such as, for example, integer and floating point formats. An example of a hybrid ISA is the IA-32 ISA, of Intel Corporation, of Santa Clara, Calif. The IA-32 ISA includes the Intel® Streaming SIMD Extension instructions, such as, for example, the SSE, SSE2, and SSE3 instruction sets. In the IA-32 ISA, certain registers, such as the 128-bit XMM registers, are multi-format registers that may store data having different formats. For example, a register may include 128-bits that may be used to store four 32-bit packed single precision floating-point data elements, two 64-bit packed double precision floating-point data elements, or one 128-bit integer data element. The MOVAPD, MOVAPS, and MOVDQA instructions of the SSE, SSE2, and SSE3 instruction sets are multi-format instructions that use the same or similar semantics to move data having different formats between XMM registers and/or between XMM registers and an off-processor memory, depending upon the particular instruction.

During a binary translation, the multi-format instructions of the hybrid ISA, such as, for example, the MOVAPD, MOVAPS, and MOVDQA instructions, may be translated to code of the unitary ISA, such as, for example, code of the Itanium® architecture, which is suitable for a 64-bit Itanium® processor or architecture.

However, the unitary ISA, such as, for example, the Itanium® architecture, may have separate registers to store data of different formats and/or may allow processing of data of only floating point or only integer formats in parallel. In order to perform the binary translation, a format may be picked for the multi-format instructions. If the formats for the multi-format instructions are not picked wisely, there may be a large cost, such as, for example, in processor cycles, in order to utilize the source code on the target machine or processor.

BRIEF DESCRIPTION OF THE SEVERAL VIEWS OF THE DRAWINGS

The invention may best be understood by referring to the following description and accompanying drawings that are used to illustrate embodiments of the invention. In the drawings:

FIG. 3 shows a flow diagram of a method of selecting formats for groups of multi-format instructions, according to one or more embodiments of the invention.

DETAILED DESCRIPTION

In the following description, numerous specific details are set forth. However, it is understood that embodiments of the invention may be practiced without these specific details. In other instances, well-known circuits, structures and techniques have not been shown in great detail in order not to obscure the understanding of this description.

Figure 1:
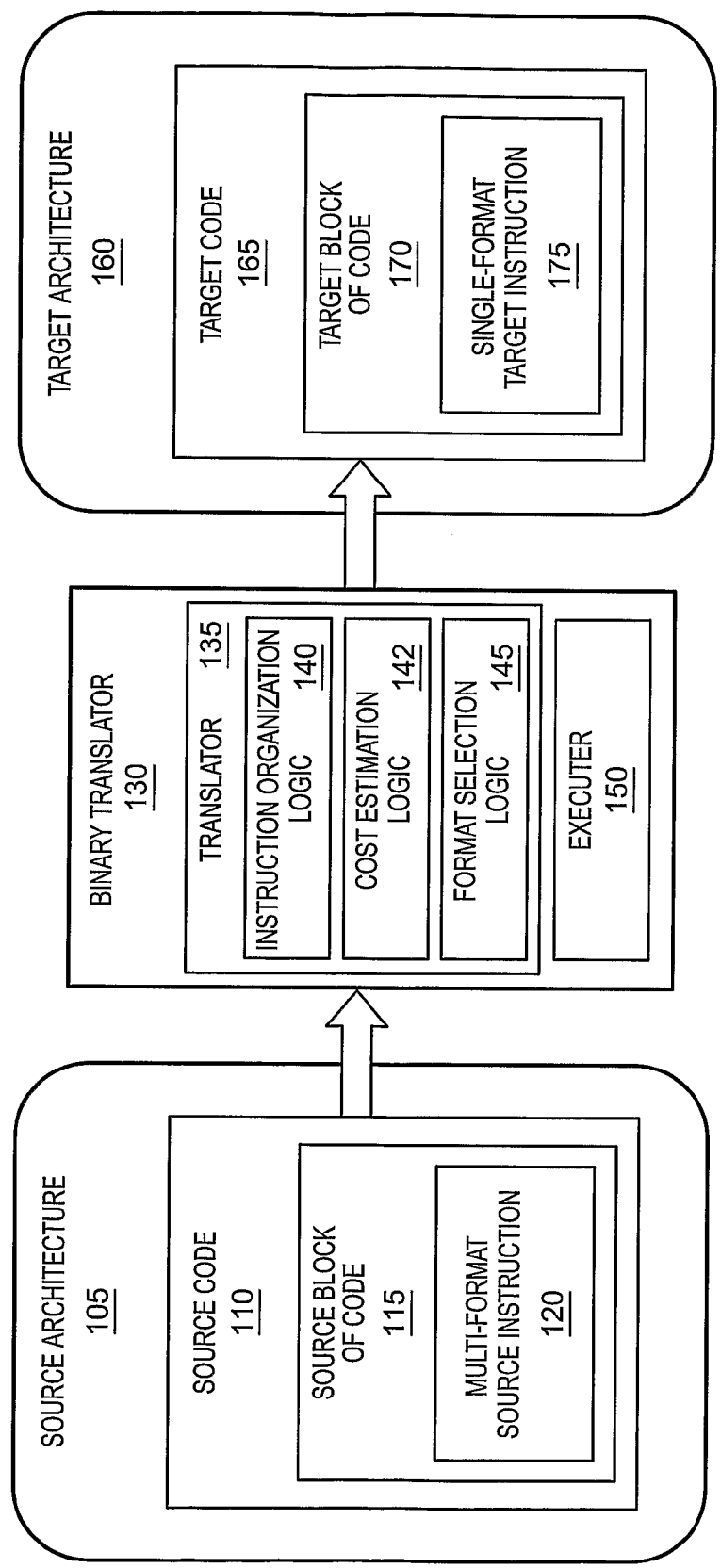
FIG. 1 shows a block diagram illustrating a binary translator, according to one or more embodiments of the invention.

FIG. 1 shows a block diagram illustrating a translation environment, according to one or more embodiments of the invention. The translation environment includes a source code 110 of a source architecture 105, a target code 165 of a target architecture 160, and a binary translator 130 to translate at least some instructions of the source code to emitted corresponding instructions of the target code.

The source code may include a source program or portion thereof that may run on the source architecture. The source code may include a program or assembly code that may be written in the assembly language of the source architecture. The assembly code may be generated by a compiler or directly from a text editor. The source code may also exist in the source machine binary code. An assembler may generate the machine binary code. The source architecture may include a processor suitable for a particular ISA that may execute executable code of the source code. In one or more embodiments of the invention, the source architecture may include a register set that may have multiple formats or data representations, such as, for example, the XMM registers of the IA-32 ISA and corresponding 32-bit processors available from Intel Corporation. The register set may include a number of architectural registers. The source code typically includes a number of source blocks of code including a source block of code 115. Likewise, the source block of code typically includes a number of source instructions including a multi-format source instruction 120.

The target code may include a target program that may run on the target architecture. The target code may include a program or assembly code that may be written in the assembly language of the target architecture. The binary translator may translate, emit, or otherwise form the target code from the source code. The target code may also optionally exist in the target machine binary code. The target architecture may include a processor suitable for a particular ISA that may execute executable code of the target code. In one or more embodiments of the invention, the target architecture, such as, for example, an Itanium® architecture, may have a register set that may not have multiple formats or data representations. The register set typically has a number of architectural registers. The target code typically includes a number of target blocks of code including a target block of code 170. The target block of code may be translated from the source block of code. The target block of code may typically include a number of target instructions including a single-format target instruction 175 that may be translated from the multi-format source instruction by the binary translator. In one or more embodiments of the invention, the single-format target instruction may specify an operation on a target register of the target architecture that may not support all of the multiple formats of a source register of the source architecture is specified by the multi-format source instruction.

The binary translator may translate the source code or at least the multi-format source instruction to at least the single-format target instruction or the target code. In one or more embodiments of the invention, the binary translator may include a translator 135 to perform a translation phase and an executer 150 to perform an execution phase of the translation. As shown, the translator may include instruction organization logic 140 to organize instructions of the source code and/or source block of code, cost estimation logic 142 to estimate costs associated with different formats for multi-format instructions, and format selection logic 145 to select formats for multi-format instructions, such as the multi-format source instruction, after and based upon the organization of the instructions. Specific, non-limiting examples of instruction organization logic, cost estimation logic, and format selection logic will be provided further below. As will be discussed further below, the binary translator, or any portion thereof, such as, for example, the instruction organization logic, the cost estimation logic, and/or the format selection logic, or any combination thereof, may include software, firmware, microcode, hardware, or combinations thereof.

Figure 2:
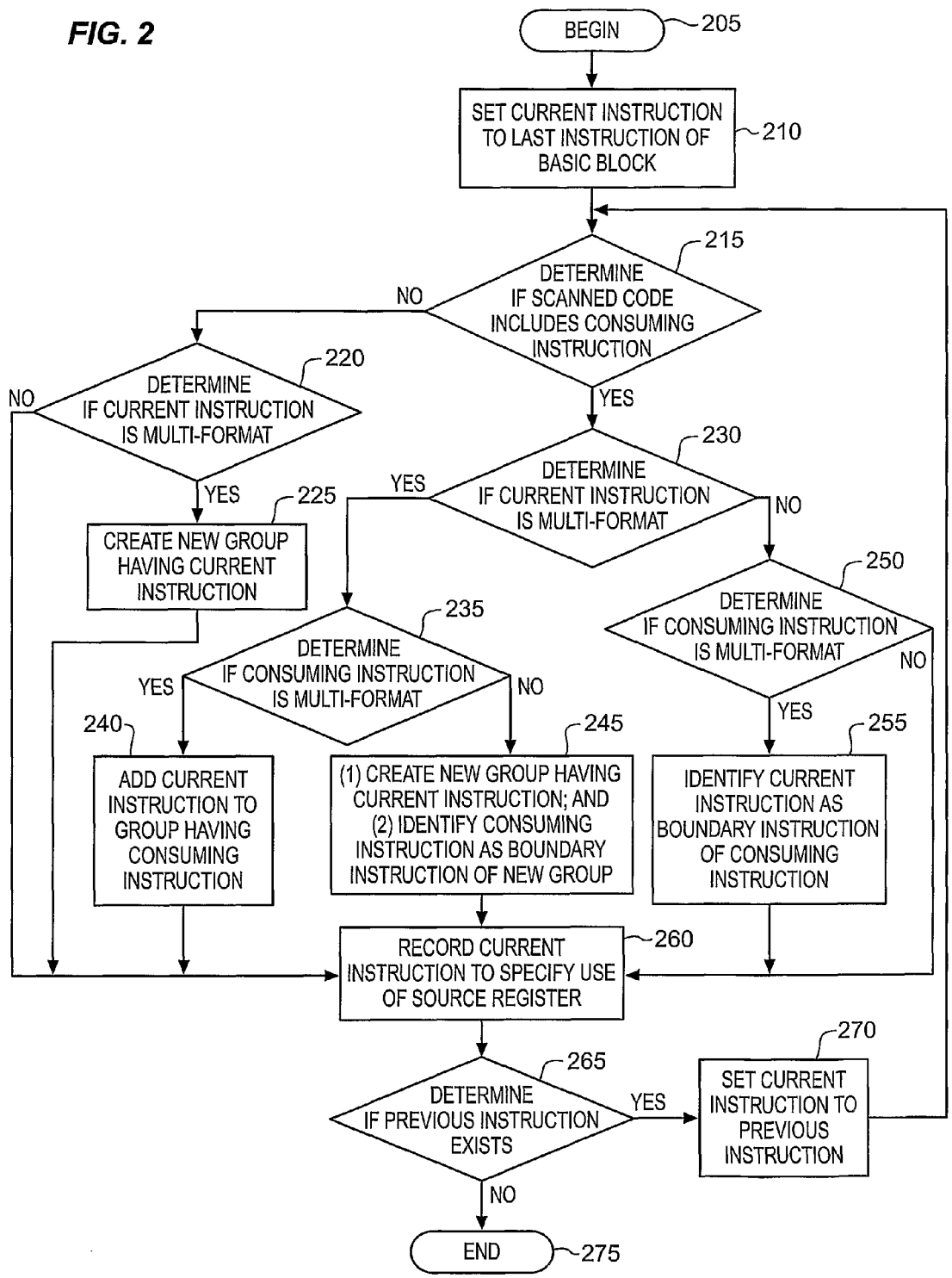
FIG. 2 shows a flow diagram of a method of grouping multi-format instructions of a block of code of a source ISA and identifying boundary instructions of the groups, according to one or more embodiments of the invention.

FIG. 2 shows a flow diagram of a method of grouping multi-format instructions of a block of code of a source ISA and identifying boundary instructions of the groups by analyzing register use relationships, according to one or more embodiments of the invention. The method includes making a series of determinations of format attributes and register use relationships that allow current instructions to be added to a new group of multi-format instructions, added to an existing group of multi-format instructions, or identified as boundary instructions, such as single-format boundary instructions, of a new or existing group of multi-format instructions. As will be discussed further below, the implementation of the method allows the instructions to be organized in a way that facilitates estimating costs associated with selecting formats for multi-format instructions.

After commencing, at block 205, a current instruction may be set to the last instruction of the basic block of code, at block 210. The illustrated method may proceed backwards through the instructions of the basic block of code. Additional variables used to implement the method, such as, for example, counters, arrays, and the like, may also optionally be initialized, at block 210.

Next, a determination may be made if the code of the block that has already been scanned includes a consuming instruction, at block 215. In one or more embodiments of the invention, the consuming instruction may be an instruction which is sequentially after the current instruction in the block of code, and which specifies use of a target register of the current instruction. That is, the current instruction and consuming instruction may be related through a register use relationship of the target register. If there are multiple instructions, which are after the current instruction, and which specify use of the target register of the current instruction, then the consuming instruction may be the instruction that is closest to the current instruction, which is the latest instruction to specify use of the target register. One way in which this determination may be made is to record register use relationship information about instructions in an array or other data structure as they are processed by the method (for example, refer to the processing at block 260). The array and information may be consulted to determine a consuming instruction. The determination of whether or not there is a consuming instruction is a determination that may be used to organize the instructions into groups and boundary instructions, as will be explained further below. The determination may be either "no" or "yes". If "no" is the determination, that is there is no consuming instruction, then a determination may be made if the current instruction is multi-format, at block 220. In one or more embodiments of the invention, in order to determine if an instruction is multi-format, the instruction may be compared to a predetermined list or other set of multi-format instructions in order to determine if the instruction under investigation matches one of the multi-format instructions of the set. If the instruction matches one of the multi-format instructions, then it may be determined that the instruction is multi-format. Alternatively, if the instruction does not match one of the multi-format instructions, then it may be determined that the instruction is not multi-format.

If "yes" is the determination at block 220, then a new group having the current instruction may be created, at block 225. This determination reveals that the current instruction is multi-format and does not have the specified register use relationship with a consuming instruction of the already scanned code and therefore may be placed in a new group. In one aspect, the current instruction may be placed in an array representing the new group. Then, the method may advance to block 260. Alternatively, if "no is the determination at block 220, then the method may advance directly to block 260. This later determination reveals that the current instruction is not multi-format and is not a boundary instruction that is useful for estimating a format conversion cost. A discussion of the processing at block 260 will be deferred until further below.

Referring again to block 215, if "yes" is the determination, then a determination may be made if the current instruction is multi-format, at block 230. The determination may be made as previously described.

If "yes" is the determination at block 230, then a determination may be made if the consuming instruction is multi-format, at block 235. If "yes" is the determination at block 235, then the current instruction may be added to an existing group having the consuming instruction, at block 240. In the illustrated method, each multi-format instruction scanned may be added to either an existing or new group. According to the illustrated logic, if the value defined by a first multi-format instruction is used by a second so called "consuming" multi-format instruction, then the first and the second instructions may be added to the same group, in particular the existing group having the consuming multi-format instruction.

Alternatively, if "no" is the determination at block 235, then a new group having the current instruction may be created, and the consuming instruction may be identified as a boundary instruction of the new group, at block 245. As discussed further below, boundary instructions may be used to estimate format conversion costs associated with the selected format for a multi-format instruction, which may influence the overall cost to utilize code for a hybrid source ISA on a target machine utilizing a unitary ISA. The method advances from either of blocks 240 and 245 to block 260.

Referring again to block 230, if "no" is the determination, then a determination may be made if the consuming instruction is multi-format, at block 250. If "yes" is the determination at block 250, then the current instruction, which is single-format, may be identified as a boundary instruction of the consuming instruction, which is multi-format, at block 255. Then, the method may advance to block 260. Alternatively, if "no is the determination at block 250, then the method may advance directly to block 260.

At block 260, the current instruction may be recorded to specify use of the source register. As previously discussed, this recordation may be used to determine if there is a consuming instruction, at block 215. In one aspect, an array called USE[0 . . . n] may be used to record instructions that use a particular register where the index may include a register number and the instruction that may be recorded is the latest instruction to use the register. The array may be indexed with a source register, at block 260, or a target register, at block 215. To further illustrate, according to one particular embodiment, consider the following two-instruction sequence of a first instruction (op1 xmm3 xmm2) followed by a second instruction (op2 xmm1 xmm3). The method may proceed backwards from the second instruction to the first instruction. For the second instruction (op2 xmm1 xmm3), xmm1 includes the target register and xmm3 includes the source register. At block 260, the second instruction (op2 xmm1 xmm3) may be recorded in the array at an index equal to the source register (xmm3). That is, USE[xmm3]=second instruction. Then, during a subsequent loop, the first instruction may be scanned. For the first instruction (op1 xmm3 xmm2), xmm3 includes the target register and xmm2 includes the source register. At block 215, it may be determined that the second instruction is a consuming instruction, since the second instruction (op2 xmm1 xmm3) is recorded in the array at an index equaling the target register of the first instruction. That is, USE[xmm3]=second instruction.

Next, a determination may be made if a previous instruction exists, at block 265. If "yes" is the determination at block 265, then the current instruction may be set to the previous instruction, at block 270, and then the method may revisit block 215 and the method described above may be performed for the new current instruction. This loop may be revisited repeatedly as the method cycles backwards through all of the instructions of the basic block of code. Alternatively, if "no" is the determination at block 265, which may occur once for each block of code, then the method may terminate, at block 275. By way of example, there may be no previous instructions when the current instruction is the first instruction in the basic block of code. After performing the method described above for all the instructions of a block of code, the method may be repeated for other blocks of code.

A particular method and order of decision making has been shown and described in order to illustrate certain concepts according to one or more embodiments of the invention, however the invention is not limited to this particular method and order of decision making. Other methods may be based on rearranging the order in which the decisions are made and/or based on making different and/or additional decisions. A variety of methods will be apparent to those skilled in the art and having the benefit of the present disclosure.

FIG. 3 shows a method of selecting formats for groups of multi-format instructions by estimating and comparing costs to translate the groups of multi-format instructions from a source ISA to corresponding instructions in a target ISA by using different formats for the multi-format instructions to estimate the costs, according to one or more embodiments of the invention. The method includes cycling through groups of multi-format instructions of a basic block of code, and for each group cycling through multiple possible formats for that group. Cost estimates for each of the possible formats are based on both the costs to translate the multi-format instructions of the group using the current selected format, and on costs to perform format conversion between the present format selected for the group and one or more boundary instructions of the group.

After commencing, at block 305, a current group of a basic block of code may be selected, at block 310. In various aspects, the groups may be selected in increasing, decreasing, or random order. However, the invention is not limited to selecting the groups in just these orders.

Next, a minimum cost variable may be set to a large number, at block 315. For example, the minimum cost variable may be set to infinity, or at least to a value that is significantly greater than expected for translating the group in any of the possible formats.

Then, a current format, such as, for example, an integer or floating-point format, may be selected from one of the possible formats for the group, at block 320. In one aspect, a first format, such as, for example, integer, may be selected before a second format, such as, for example, floating point. In another aspect, the formats may be selected in alternating order, or randomly selected. However, the invention is not limited to selecting the formats in just these ways.

Processing next continues with blocks 325 and 330 where costs associated with translating the multi-format instructions of the current group from the source ISA to instructions of a target ISA are estimated by using the current format of the multi-format instructions. As shown in the illustrated embodiment, the cost may be estimated by considering contributions for both translating the multi-format instructions and performing format conversion between the current format and formats of boundary instructions identified for the current group. The illustrated order of estimating the costs is not required, and an alternate order is also suitable.

A cost to translate the multi-format instructions of the current group using the current selected format may be estimated, at block 325. In one or more embodiments of the invention, the cost may be estimated by adding together contributing costs to translate each of the multi-format instructions of the group. For each multi-format instruction, a cost contribution may be estimated to translate the multi-format instruction to a corresponding single-format instruction of the target ISA. In one or more embodiments of the invention, each of the contributing costs may be estimated based on and/or by using a predetermined estimate of the cost for a particular translation. According to one or more implementations, the costs may optionally be expressed in processor cycles or at least directly related to the number of processor cycles that are expected in order to perform the translation. However the invention is not limited to these particular implementations, and the costs discussed herein may also optionally be expressed in terms of heat generation, precision, register utilization, or other criteria relevant to selecting a format of a multi-format instruction.

Table 1 lists predetermined costs in processor cycles for representative translations of various multi-format IA-32 instructions, namely MOVAPD, MOVAPS, and MOVDQA, to corresponding instructions in an Itanium® architecture in integer and floating point formats.

TABLE 1

| IA-32 INSTRUCTION | ITANIUM ® INSTRUCTION | FORMAT | COST USING FLOATING POINT (PROCESSOR CYCLES) |
|---|---|---|---|
| MOVAPD | 2 Ld8 in parallel | INTEGER | 2 |
| MOVAPD | 2 LDFD in parallel/Or One LDFPD | FLOATING POINT | 7 |
| MOVAPS | 2 Ld8 in parallel | INTEGER | 2 |
| MOVAPS | 2 LDFD in parallel/Or One LDFPD | FLOATING POINT | 7 |
| MOVDQA | 2 Ld8 in parallel | INTEGER | 2 |
| MOVDQA | 2 LDFD in parallel/Or One LDFPD | FLOATING POINT | 7 |

The IA-32 instructions may optionally be translated into one or more (e.g., two) Itanium® instructions. LDFD is an 8-byte float point load instruction. LDFPD is a 16 byte parallel float point load instruction. Itanium® 2 processors may issue six instructions and execute them in parallel, so the latency of two LDFD instructions may be the same as the latency of one LDFPD instruction. Cost estimates for translations of individual multi-format instructions, such as, for example, as given above, may be added together for each of the instructions in the group. As shown, the costs for an integer format may be less than for a floating-point format.

However, to improve estimation of the total cost, costs associated with performing format conversions resulting from the current selected format may optionally be included, as will be discussed next.

A cost to perform format conversion between the format corresponding to the current group and a format corresponding to one or more boundary instructions of the current group may optionally be estimated, at block 330. If the selected format of the current group is different than the format of a boundary instruction of the current group, then additional conversion code, for example including one or more format conversion instructions, may be included in the translated code in order to convert between the formats. The format conversion instructions may convert a format of a single-format instruction having the same format as the currently selected format of the current group to a different format of an instruction that corresponds to, and has the same format as, a boundary instruction of the current group. By way of example, a format conversion instruction may convert an integer value in one register to a floating-point value in another register, or the vice versa. Representative conversion instructions in the Itanium® architecture include, but are not limited to, getf.d and setf.d.

Now, the inclusion of the conversion code may represent an additional contribution to the cost to perform the translation. In one or more embodiments of the invention, costs for each conversion instruction for the current group may be added together to determine the total cost due, at least in part, to format conversion for the current group. In one aspect, predetermined estimates of the costs to include particular conversion instructions may be tabulated or otherwise provided and may be used in the cost estimation. Due at least in part to the current selected format, some conversion instructions may potentially be eliminated, and these eliminated conversion instructions may be subtracted or otherwise removed in order to determine a net conversion cost. As before, the cost estimates may be in terms of processor cycles, or other criteria relevant to selecting a format for a multi-format instruction. Accordingly, format selection for a group may be based at least in part on an analysis of format flow between instructions and estimates of format conversion cost.

Table 2 lists representative costs in processor cycles to include various conversion instructions of the Itanium® architecture in the translated code.

TABLE 2

| INSTRUCTION | COST (PROCESSOR CYCLES) |
|---|---|
| getf.d | 5 to 6 |
| setf.d | 6 |

Referring again to FIG. 3, at block 335, a determination may be made if the minimum cost variable is greater than the sum of the costs estimated at blocks 325 and 330. The determination may be either "yes" or "no".

If "yes" is the determination at block 335, then processing may proceed to block 340. During the first pass through the loop, "yes" may be the determination, since the minimum cost was set to a large number at block 315. At block 340, the minimum cost may be set to the sum of the costs estimated at blocks 325 and 330. This may replace the large number with the sum of the costs generated using the first selected format for the multi-format instructions of the group. Also, at block 340, the current format may be selected as the format of the current group. This may associate the new minimum cost with the format corresponding to that cost. During subsequent passes through the loop for the same group, "yes" may be the determination if the sum of the estimated costs is lower than the minimum cost. Repeating this determination over all possible formats for the group may allow selection of the format having the lowest sum of estimated costs. Accordingly, selection of the format for the group may be based on a comparison of estimated costs for translating using multiple different possible formats for the multi-format instructions. Then, the method may advance to block 345. Alternatively, if "no" is the determination at block 335, then the method may advance directly to block 345. In this later case, the selection of a previous format and associated cost are maintained.

At block 345, a determination may be made if there is another possible format for the group of multi-format instructions. If "yes" is the determination at block 345, then the method may revisit block 320, where another current format may be selected from the remaining possible formats. For multi-format instructions, this may be the determination at least during the initial or first pass through the loop for each group, since the instructions may have more than one format.

Alternatively, if "no" is the determination at block 345, such as, for example, may be the case when costs for all of the possible formats for the group have been considered, then all the multi-format instructions of the current group may be assigned to the selected format corresponding to the minimum cost, at block 350. In one or more embodiments of the invention, the multi-format instructions of the current group may be assigned to the selected format in a table, or other data structure, which may be in a machine-readable format. This data structure may be read or otherwise accessed when translating the block in order to determine the selected formats for the groups of multi-format instructions, and then the corresponding translation template may be used to perform the translation. Accordingly, in the illustrated method, the format of the multi-format instructions of a group may be selected and assigned based, at least in part, on a comparison of costs estimated using different possible formats for the multi-format instructions.

Referring again to FIG. 3, a determination may be made if there is another group of multi-format instructions in the block of code, at block 355. If "yes" is the determination, then the method may revisit block 310, where another current group may be selected. Alternatively, if "no" is the determination, such as, for example, may be the case when all the groups of the block of code have been considered, then the method may terminate, at block 360.

Next, the code may be translated from the source ISA, such as, for example, an IA-32 ISA, to the target ISA, such as, for example, an Itanium® architecture, or other architecture suitable for a 64-bit processor, by using the selected formats for the groups of multi-format instructions. In one or more embodiments of the invention, all of the multi-format instructions in a group may be translated in the same format, which may represent a relatively low or lowest cost format. The translation may be performed in a translator, such as, for example, a dynamic binary translator or just in time compiler, to name just a few examples. The dynamic binary translator or just in time compiler may translate the source code to target code just prior to execution of the code. However, performing dynamic translation is not required.

The time complexity of the combined instruction organization and format selection phases of the algorithm described in FIGS. 2-3 may be O(n). This means that if there are n instructions in a block, the algorithm may perform k*n operations, where k is a constant. The low time complexity of the algorithm may be well suited for dynamic binary translation. Other algorithms may have greater time complexities of $O(n^2)$, $O(n^3)$, or even higher. To illustrate, for an $O(n^2)$ algorithm, k*n*n operations may be performed, where k is a constant, and n is the number of instructions in a block.

Further, there may be other routines and optimization routines implemented within a binary translator. Some of the routines may include scanning backwards through the instructions and/or source high-level Intermediate Representation (IR) of a block. Recall that the instruction organization phase of the exemplary algorithm illustrated in FIG. 2 likewise scanned backwards through the instructions of a block. In one or more embodiments of the invention, one or more of the routines or optimization routines may be merged with a method as disclosed herein, such as, for example, the instruction organization method illustrated in FIG. 2, which may also scan backwards through the instructions. That is, multiple optimization routines may gather information about the instructions in parallel during a backwards scan through the instructions. This may allow portions of multiple routines to run in parallel, which may tend to promote better runtime performance of the binary translation.

To further illustrate certain concepts, consider representative translations of instructions both with and without application of the format selection methods disclosed herein. In particular, let's consider translations of instructions from a source IA-32 ISA to corresponding instructions of a target Itanium® architecture.

Figure 4A:
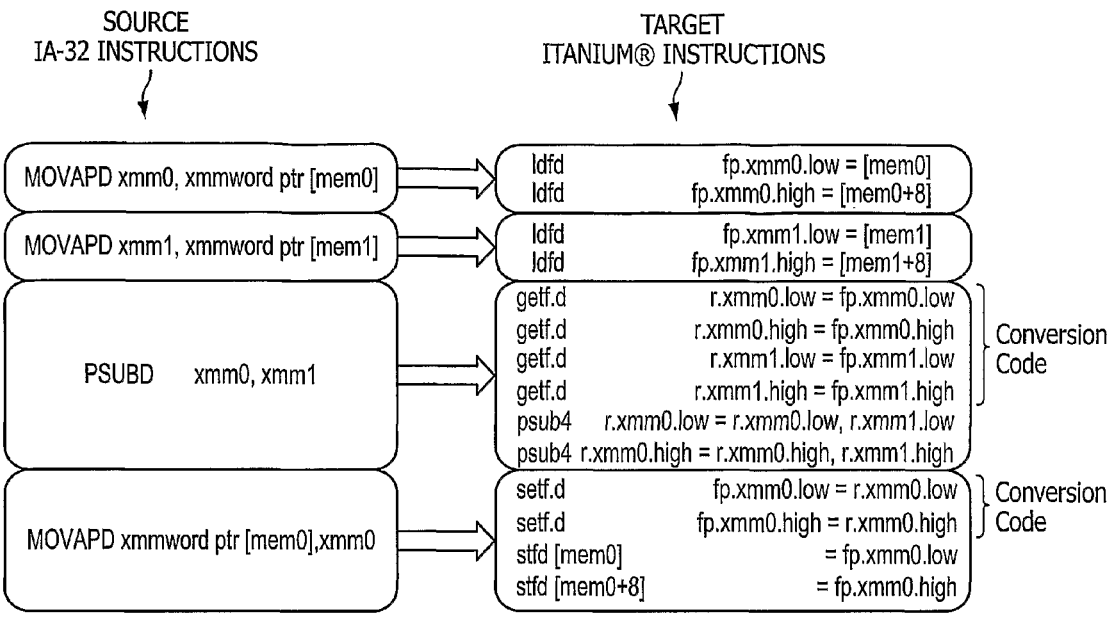
FIG. 4A shows a representative translation of IA-32 instructions to corresponding Itanium® instructions without format selection using the methods disclosed herein.

FIG. 4A shows the IA-32 instructions and the corresponding Itanium® instructions without format selection using the methods disclosed herein. The IA-32 instructions include exemplary SSE2 instructions to load two floating-point operands, get the packed doubleword integers, and subtract the result. In the IA-32 instructions, the MOVAPD instructions are multi-format instructions, whereas the PSUBD instruction is a single-format instruction. The corresponding translated Itanium® instructions are shown on the right-hand side of the figure. The ldfd and stfd instructions represent floating point memory access instructions. fp.xmm*.low/high are a pair of floating point registers in the Itanium® architecture corresponding to XMM* in the IA-32 architecture. r.xmm*.low/high are a pair of integer registers in the Itanium® architecture corresponding to XMM* in the IA-32 architecture. Additionally, included in the Itanium® instructions are four different getf.d instructions and two different setf.d instructions. These instructions represent conversion code to perform format conversion. Inclusion of the format conversion code in the target code may tend to make the code verbose and may represent additional cost in processor cycles to utilize the source code on the target architecture.

Figure 4B:
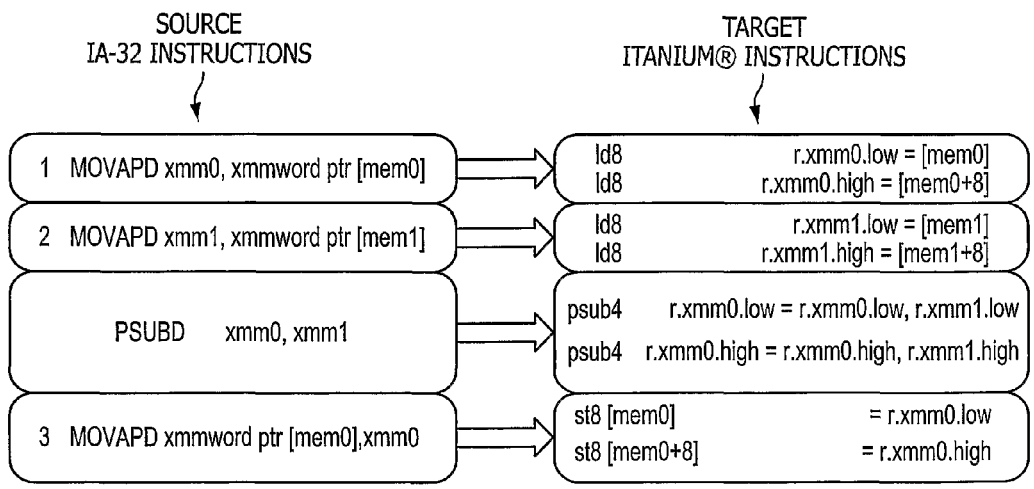
FIG. 4B shows a representative translation of IA-32 instructions to corresponding Itanium® instructions with format selection, according to one or more embodiments of the invention.

FIG. 4B shows the IA-32 instructions and the corresponding Itanium® instructions with format selection similar to that illustrated in FIGS. 2-3, according to one or more embodiments of the invention. During an instruction organization process, such as, for example, similar to the method shown in FIG. 2, MOVAPD xmm0, xmmword ptr [mem0] may be identified as an instruction of Group 1, MOVAPD xmm1, xmmword ptr [mem1] may be identified as an instruction of Group 2, and MOVAPD xmmword ptr [mem0], xmm0 may be identified as an instruction of Group3. Then, a format selection process, such as, for example, similar to the method shown in FIG. 3, may be used to select formats for the groups. In an application of such a method, the following formats were determined: Group1: xmm0 chose PINT format; Group2: xmm1 chose PINT format; and Group3: xmm0 chose PINT format. The corresponding translated Itanium® instructions are shown on the right-hand side of the figure. The translated Itanium® instructions are less verbose and less costly to utilize as a result of application of the methods disclosed herein.

Now, the invention is not limited to the particular embodiments described above. The description of these embodiments should thus be regarded as illustrative instead of limiting. Many further modifications are contemplated. For example, in one or more embodiments of the invention, an algorithm, such as, for example, a greedy algorithm, may be used to select formats for multi-format instructions individually, rather than selecting formats for entire groups of multi-format instructions. In such an approach, instructions may be considered in either forward or backwards order.

As another example, the multi-format instructions may be formed into groups, for example as described above, but then a different approach, such as, for example, based on dynamic programming, may be used to estimate costs inside a group and select formats for the groups based on the estimated costs. As a still further example, a complete enumeration algorithm may be used in which the instructions are not formed into groups, but rather the algorithm may attempt to select favorable formats for the individual instructions by complete enumeration and evaluation of every possible format for every instruction in a basic block. Many further modifications and adaptations will be apparent to those skilled in the art and having the benefit of the present disclosure.

Figure 5:
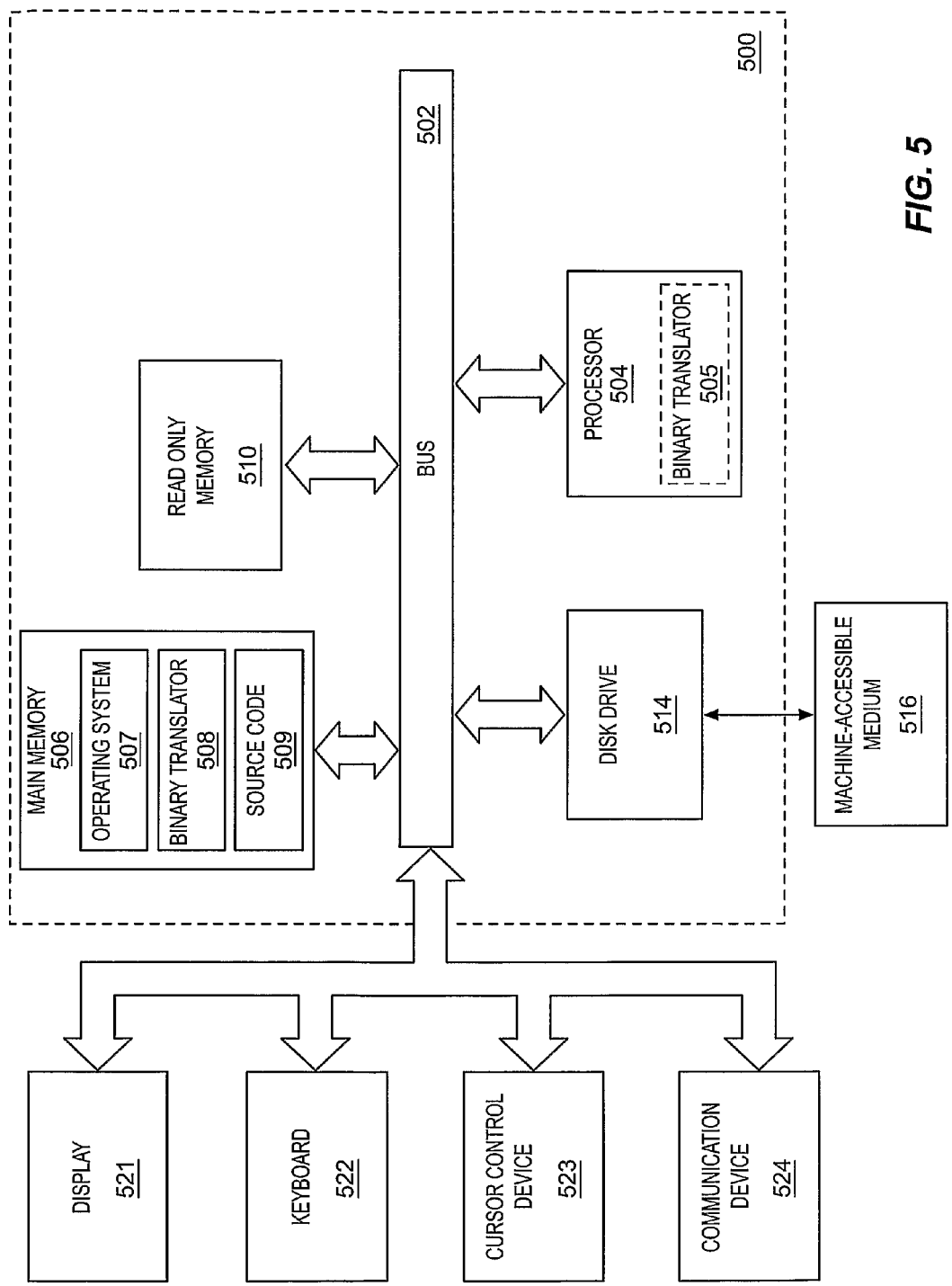
FIG. 5 shows a block diagram of a computer system that may be used to implement one or more embodiments of the invention.

FIG. 5 shows a block diagram of a computer system that may be used to implement one or more embodiments of the invention. As used herein, a computer system may include an apparatus having hardware and/or software to process data. The computer system may include, but is not limited to, a desktop, laptop, server, or mainframe computer, to name just a few examples. The computer system represents one possible computer system for implementing one or more embodiments of the invention, however other computer systems and variations of the computer system are also possible.

The computer system includes a bus 502 to communicate information. The bus may optionally be implemented as two or more buses coupled through hubs, as is known in the computer system arts. A processor 504 is coupled with the bus to process information. In one or more embodiments of the invention, the processor may include a 64-bit processor, such as, for example, an Intel® Itanium® 2 Processor or Intel® Itanium® Processor available from Intel Corporation, of Santa Clara, Calif. Other 64-bit processors are also suitable. Multiple processors may also optionally be included.

The computer system further includes a main memory 506, such as, for example, a random access memory (RAM) or other dynamic storage device, coupled with the bus to store information including instructions to be executed by the processor. Different types of RAM memory that are included in some, but not all, computer systems, include, but are not limited to, static-RAM (SRAM) and dynamic-RAM (DRAM).

As shown in the illustrated embodiment, an operating system 507 may be stored in the main memory. Representative Windows®-based operating systems that are suitable include, but are not limited to, Windows™ Server 2003 Enterprise Edition for 64-Bit Itanium®-based Systems, Windows™ Server 2003 Datacenter Edition for 64-Bit Itanium®-based Systems, and Windows™ XP 64-Bit Edition. Linux, Unix®, and other operating systems are also suitable.

As further shown, in the illustrated embodiment, a binary translator 508, or a portion thereof, such as, for example, instruction organization logic, cost estimation logic, and/or format selection logic, or another portion to at least assist with implementing a method as disclosed herein, may include software that may be stored in the main memory. The software may include code or code segments having instructions to perform certain tasks associated with implementing the methods. In various aspects, the code segment may represent a driver, procedure, function, subprogram, program, routine, subroutine, module, software package, class, or combination of instructions, data structures, or program statements, or some combination of these. Suitable languages include, but are not limited to, Java®, C/C++, assembly language, and combinations of high-level language and assembly language. A code segment may be coupled with another code segment or hardware by passing and/or receiving information, data arguments, parameters, or memory contents. The binary translator or portion thereof may also or alternatively optionally include firmware and/or microcode.

In one or more embodiments of the invention, the methods and apparatus disclosed herein may be used in part to provide ISA compatibility for a lower-bit or older processor, such as, for example, a 32-bit processor, on a higher-bit or newer processor, such as, for example, a 64-bit processor. It is contemplated that the methods disclosed herein may help to improve the processor cycle or other performance of 32-bit applications running on 64-bit processor systems, such as, for example, Intel® Itanium® processor family systems. It is also contemplated that the methods may help to extend the life and/or usefulness of legacy 32-bit applications, such as, for example, applications where maximum performance is not required and/or applications and/or libraries where source code is not available.

In one or more embodiments of the invention, the software or code segments to assist with implementing one or more methods disclosed herein may be included in IA-32 Execution Layer (EL) software, available from Intel Corporation. The IA-32 EL may be shipped and/or integrated with Itanium®-based operating systems and may be used to convert IA-32 instructions to Itanium® instructions through dynamic translation. The IA-32 EL software may use a two-phase translation architecture including translation and execution phases. The IA-32 EL may be suitable for multiple different operating systems, such as, for example, various Windows-based operating systems and one or more Linux operating systems. The IA-32 EL may run above the 64-bit operating system in the application programs virtual space and privileged level. The IA-32 EL may get control from the operating system in order to run the 32-bit code of the application within the virtual address space. If desired, further background information on IA-32 EL is available in the article, "IA-32 Execution Layer: a two-phase dynamic translator designed to support IA-32 applications on Itanium®-based systems", written by Leonid Baraz, et al., and published in Proceedings of the 36th International Symposium on Microarchitecture (MICRO-36 2003), of IEEE.

As further shown, in the illustrated embodiment, The main memory may also store and provide source code 509 including multi-format instructions, such as, for example, the MOVAPD, MOVAPS, and MOVDQA instructions of the IA-32 ISA. The binary translator may translate the source code, including the multi-format instructions, to instructions suitable for the processor.

The computer system also includes a disk drive 514. The illustrated disk drive is internal to the computer system, although it may optionally be external. The disk drive may include a machine to read and/or write data to and/or from a machine-accessible and/or readable medium 516. Suitable disk drives include, but are not limited to, hard disk drives, floppy drives, magnetic disk drives, and optical drives. Suitable corresponding machine-accessible mediums include, but are not limited to, hard disks, floppy disks, magnetic disks, and optical disks. In one or more embodiments of the invention, instructions or code segments to at least assist in performing one or more of the methods disclosed herein, may be stored on the machine-accessible medium, read from the machine-accessible medium by the disk drive, stored on the main memory, and used during dynamic and/or static binary translation. The software instructions and/or code segments may also optionally be pre-installed in the main memory. Source code suitable for a source ISA and including multi-format instructions may also optionally be stored on the machine-accessible medium, read, stored on the main memory, and translated by the binary translator using one or more of the methods disclosed herein.

Referring again to the processor, as shown by the dashed lines, in one or more alternate embodiments of the invention, the processor may optionally include circuitry representing a binary translator 505, or any portion thereof, such as, for example, instruction organization logic, cost estimation logic, and/or format selection logic, or other logic to assist with implementing one or more methods disclosed herein. As yet another option, the hardware may be provided on a chip other than the processor.

The computer system also includes a read only memory (ROM) 510 coupled with the bus to store static information and instructions for the processor, such as, for example, the basic input-output system (BIOS). Different types of memory that are included in some, but not all, computer systems include Flash memory, programmable ROM (PROM), erasable-and-programmable ROM (EPROM), and electrically-erasable-and-programmable ROM (EEPROM).

The computer system may also optionally be coupled via the bus with a display 521, such as, for example, a cathode ray tube (CRT) or liquid crystal display (LCD), to display information to an end user. A keyboard 522 may optionally be coupled with the bus to communicate information and command selections to the processor. Another type of user input device that may optionally be included is a cursor control device 523, such as, for example, a mouse, trackball, or cursor direction keys, to communicate direction information and command selections to the processor, and to control cursor movement on the display device.

A communication device 524 may also optionally be coupled with the bus. Communication devices are included in some, but not all, computer systems. Depending upon the particular implementation, the communication device may include a modem, a network interface card, or other well-known interface devices, such as, for example, those used for coupling with Ethernet, token ring, or other types of physical attachment for purposes of providing a communication link to support a local or wide area network, for example. In one aspect, software instructions to implement one or more embodiments of the invention may be received by the communication device from a network.

In the description above, for the purposes of explanation, numerous specific details have been set forth in order to provide a thorough understanding of the embodiments of the invention. It will be apparent, however, to one skilled in the art, that one or more other embodiments may be practiced without some of these specific details. In other instances, well-known circuits, structures, devices, and techniques have been shown in block diagram form and/or without detail in order not to obscure the understanding of this description.

One or more embodiments of the invention may include various operations. The operations may be performed by hardware components, or may be embodied in machine-executable instructions, which may be used to cause, or at least result in, a general-purpose or special-purpose processor or logic circuit programmed with the instructions performing the operations. Alternatively, the operations may be performed by a combination of hardware and software.

One or more embodiments of the invention may be provided as a program product or other article of manufacture that may include a machine-accessible and/or readable medium having stored thereon or otherwise providing one or more instructions and/or data structures. The machine-accessible medium may provide the instructions, which, if executed by a machine, may result in and/or cause the machine to perform one or more operations or methods as disclosed herein. Suitable machines include, but are not limited to, processors, computer systems, such as, for example, personal computers, workstations, and servers, and a wide variety of other devices having one or more processors. The machine-accessible medium may include, any mechanism that provides, for example stores and/or transmits, information in a form that is accessible by a machine. For example, a machine-accessible medium may include recordable and/or non-recordable media, such as a floppy diskette, optical storage media, optical disk, CD-ROM, magnetic disk storage media, magneto-optical disk, read only memory (ROM), random access memory (RAM), DRAM, EPROM, EEPROM, Flash memory, or a combination, to name just a few examples. A machine-accessible medium may also include an electrical, optical, acoustical or other form of propagated signal, such as carrier waves, infrared signals, or propagated digital signals, for example. One or more embodiments of the invention may be downloaded as a computer program product, wherein the program may be transferred from one computer or other machine to another computer or other machine by way of data signals embodied in a carrier wave or other propagation signal or medium via a communication link, such as, for example, a modem or network connection.

Many of the methods are described in their most basic form, but operations may optionally be added to and/or deleted from the methods. The methods may be illustrated by way of flow diagrams as a sequential process, although operations may optionally be performed in parallel or concurrently. In addition, the order of the operations may optionally be re-arranged. It will be apparent to those skilled in the art that many further modifications and adaptations may be made. The particular embodiments are not provided to limit the invention but to illustrate it. The scope of the invention is not to be determined by the specific examples provided above but rather by the claims below.

It should also be appreciated that reference throughout this specification to "one embodiment", "an embodiment", or "one or more embodiments", for example, means that a particular feature may be included in the practice of the invention. Similarly, it should be appreciated that in the foregoing description of exemplary embodiments of the invention, various features are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

While the invention has been described in terms of several embodiments, those skilled in the art will recognize that the invention is not limited to the embodiments described, but may be practiced with modification and alteration within the spirit and scope of the appended claims. The description is thus to be regarded as illustrative instead of limiting.

The invention claimed is:

1. A method comprising:
    estimating costs associated with translating a multi-format instruction of a source instruction set architecture (ISA) to a single-format instruction of a target ISA;
    selecting a format, from a group of formats, the selection based at least in part on the estimated costs for translating the multi-format instruction, wherein the group of formats having a common relationship associated with the multi-format instruction; and
    translating the selected format to the single-format instruction of the target ISA, wherein estimating the costs comprises accessing and adding together cost estimates, associated with the format, as number of processor cycles.

2. The method of claim 1, wherein the group of formats includes: MOVAPD, MOVAPS, and MOVDQA of an IA-32 ISA.

3. The method of claim 1, wherein the costs associated with estimating are expressed as a number of processor cycles or processor heat generation.

4. An article of manufacture comprising a non-transitory machine-accessible storage medium that stores machine executable instructions that when executed cause a machine to perform a method comprising:
    estimating costs associated with translating a multi-format instruction of a source instruction set architecture (ISA) to a single-format instruction of a target ISA;

selecting a format, from a group of formats, the selection based at least in part on the estimated costs for translating the multi-format instruction, wherein the group of formats having a common relationship associated with the multi-format instruction; and translating the selected format to the single-format instruction of the target ISA, wherein estimating the costs comprises accessing and adding together cost estimates, associated with the format, as number of processor cycles.

5. The article of manufacture of claim 4, wherein the group of formats includes: MOVAPD, MOVAPS, and MOVDQA of an IA-32 ISA.

6. The article of manufacture of claim 4, wherein selecting the format, from the group of formats, is based on the format having a lowest estimated cost.

7. An apparatus comprising:
a first circuit to estimate costs associated with translating a multi-format instruction of a source instruction set architecture (ISA) to a corresponding single-format instruction of a target ISA;
a second circuit to select a format, from a group of formats, the selection based at least in part on the estimated costs for translating the multi-format instruction, wherein the group of formats having a common relationship associated with the multi-format instruction; and
a third circuit for translating the selected format to the single-format instruction of the target ISA, wherein the first circuit to estimate the costs by accessing and adding together cost estimates, associated with the format, as number of processor cycles.

8. The apparatus of claim 7, wherein the group of formats includes: MOVAPD, MOVAPS, and MOVDQA, wherein the source ISA comprises an IA-32 ISA, and wherein the target ISA comprises an ISA suitable for a 64-bit processor.

9. The apparatus of claim 7, wherein the first circuit comprises a circuit portion to estimate a format conversion cost to convert between the selected format and a format corresponding to that of a boundary instruction associated with the multi-format instruction, and wherein the cost associated with estimating is expressed as a number of processor cycles or processor heat generation.

10. The article of manufacture of claim 4, wherein estimating the costs comprises:
estimating a first cost that corresponds to a first format of the multi-format instruction of the source ISA, wherein estimating the first cost includes:
estimating a first contribution to the first cost to translate the multi-format instruction of the first format to one or more single-format instructions of the first format in the target ISA;
estimating a second contribution to the first cost to convert the first format of the one or more single-format instructions to a different format of an instruction corresponding to a boundary instruction that has a register use relationship with the multi-format instruction; and
estimating a second cost that corresponds to a second format of the multi-format instruction.

11. The article of manufacture of claim 10, wherein selecting the format comprises selecting one of the first format and the second format for the multi-format instruction having a lower corresponding estimated cost,
wherein the source ISA includes an IA-32 ISA, and
wherein the target ISA is suitable for a 64-bit processor.

12. The article of manufacture of claim 10, wherein estimating the first cost comprises estimating the first cost in number of processor cycles.

13. The article of manufacture of claim 4, wherein the non-transitory machine-accessible storage medium stores machine executable instructions that when executed result in the machine performing operations including:
for a first instruction in a block of code, determining if the block of code includes a second instruction, which is after the first instruction, and which specifies use of a target register of the first instruction;
if the block of code includes the second instruction, determining if the first instruction is multi-format;
if the first instruction is multi-format, determining if the second instruction is multi-format; and
if the second instruction is multi-format, adding the first instruction to a group having the second instruction.

14. The article of manufacture of claim 13, wherein the non-transitory machine-accessible storage medium further stores machine-executable instructions that when executed result in the machine performing operations including:
if the second instruction is not multi-format, creating a second group having the first instruction; and
identifying the second instruction as a boundary instruction of the second group.

15. The article of manufacture of claim 13, wherein the non-transitory machine-accessible storage medium further stores machine executable instructions that when executed result in the machine performing operations including:
if the first instruction is not multi-format, determining if the second instruction is multi-format; and
if the second instruction is multi-format, identifying the first instruction as a boundary instruction of the second instruction.

16. The article of manufacture of claim 4, wherein the non-transitory machine-accessible storage medium stores machine-executable instructions that when executed result in the machine performing operations including:
for a first instruction in a block of code, determining if the block of code includes a second instruction, which is after the first instruction, and which specifies use of a target register of the first instruction;
if the block of code does not include the second instruction, determining if the first instruction is multi-format; and
if the first instruction is multi-format, creating a group having the first instruction.

17. The article of manufacture of claim 16, wherein the non-transitory machine-accessible storage medium further stores machine executable instructions that when executed result in the machine performing operations including:
if the block of code includes the second instruction, determining if the first instruction is multi-format;
if the first instruction is multi-format, determining if the second instruction is multi-format; and
if the second instruction is not multi-format, creating a second group having the first instruction.

18. The article of manufacture of claim 17, wherein the non-transitory machine-accessible storage medium further stores machine executable instructions that when executed result in the machine performing operations including:
if the second instruction is not multi-format, identifying the second instruction as a boundary instruction of the second group.

19. The article of manufacture of claim 4, wherein the non-transitory machine-accessible storage medium stores instructions that when executed result in the machine performing operations including:

grouping multi-format instructions of a block of code of the source ISA into groups including at least a group by analyzing register use relationships between the multi-format instructions;

identifying an instruction of the block of code as a boundary instruction of the group by analyzing a register use relationship between the instruction and a multi-format instruction of the group; and estimating costs associated with translating a multi-format instruction of the group to single format instructions of target ISA by using a different format for the multi-format instruction to estimate each of the costs, wherein said estimating the costs includes estimating a cost to convert a format of a single-format instruction of the target ISA to a different format of an instruction corresponding to a boundary instruction of the group.

20. The article of manufacture of claim 19, wherein the source ISA comprises an IA-32 ISA, and wherein the target ISA is suitable for a 64-bit processor.

21. The article of manufacture of claim 4, wherein the non-transitory machine-accessible storage medium further stores machine-executable instructions that when executed result in the machine performing operations including:

assigning the selected format to the IA-32 multi-format instruction.

22. A system comprising:

a bus;

a 64-bit processor coupled with the bus;

a DRAM memory coupled with the bus;

code stored on the DRAM memory, the code including an IA-32 multi-format instruction; and logic to perform operations including:

logic to perform operations including:

estimating costs associated with translating the IA-32 multi-format instruction to a single-format instruction of an instruction set architecture (ISA) of the 64-bit processor;

selecting a format, for a group of formats, for the IA-32 multi-format instruction based at least in part on the estimated costs for translating the IA-32 multi-format instruction, wherein the group of formats having a common relationship associated with the IA-32 multi-format instruction; and translating the selected format to the single-format instruction of the ISA of the 64-bit processor, wherein estimating the costs comprises accessing and adding together cost estimates, associated with the format, as number of processor cycles, wherein estimating the costs comprises accessing and adding together cost estimates, associated with the format, as number of processor cycles.

23. The system of claim 22, wherein the logic comprises instructions stored on the DRAM memory that if executed result in the 64-bit processor performing the operations.

24. The system of claim 22, wherein the logic comprises a circuit on the 64-bit processor.

* * * * *